United States Patent
Johnatakis et al.

[11] Patent Number: 5,134,328
[45] Date of Patent: Jul. 28, 1992

[54] SUBMERSIBLE PUMP PROTECTION FOR HOSTILE ENVIRONMENTS

[75] Inventors: John Johnatakis, Riverton; Lawrence T. Gobble, Sandy, both of Utah

[73] Assignee: Baker Hughes Incorporated, Houston, Tex.

[21] Appl. No.: 680,305

[22] Filed: Apr. 4, 1991

[51] Int. Cl.[5] .................. H02K 9/19; H02K 9/00; H02K 5/10; H02K 5/12

[52] U.S. Cl. ........................... 310/54; 310/87; 310/85

[58] Field of Search ............ 310/54, 64, 85, 87, 310/88, 89; 417/423.14, 423.3, 423.8, 422

[56] References Cited

U.S. PATENT DOCUMENTS

| | | | |
|---|---|---|---|
| 2,369,440 | 2/1945 | Curtis | 417/423.3 |
| 2,667,127 | 1/1954 | Rimann | 417/423.8 |
| 2,885,962 | 5/1959 | Campbell | 310/54 |
| 2,885,963 | 5/1959 | Ivanoff | 417/423.8 |
| 3,130,676 | 4/1964 | Beaulieu | 310/87 |
| 3,179,033 | 4/1965 | Limberger | 417/422 |
| 3,264,999 | 8/1966 | Tutthill | 417/423.3 |
| 3,371,613 | 3/1968 | Dahlgren et al. | 310/54 |
| 3,631,275 | 12/1971 | Conrad et al. | 310/43 |
| 3,814,961 | 6/1974 | Nelson et al. | 310/87 |

FOREIGN PATENT DOCUMENTS

| | | | |
|---|---|---|---|
| 0147746 | 7/1986 | Japan | 310/88 |
| 0547924 | 6/1977 | U.S.S.R. | 310/88 |
| 0832655 | 5/1981 | U.S.S.R. | 310/85 |
| 1096478 | 12/1967 | United Kingdom | 310/87 |

Primary Examiner—Steven L. Stephan
Assistant Examiner—C. LaBalle
Attorney, Agent, or Firm—Trask, Britt & Rossa

[57] ABSTRACT

The protection of submersible electric pump motors against hostile environments involving corrosive, abrasive and erosive fluids including an elastomeric boot or sleeve which substantially envelops the motor and which is sealed at its mouth to the periphery of the motor at one end. The interior of the boot between the motor and the boot wall is substantially filled with a heat transfer fluid such as ethylene glycol or a mixture of same and water.

21 Claims, 2 Drawing Sheets

SUBMERSIBLE PUMP PROTECTION FOR HOSTILE ENVIRONMENTS

BACKGROUND OF THE INVENTION

1. Field of the Invention

The present invention relates generally to submersible pumps, and in particular to submersible pumps deployed in particularly hostile environments and a means and method for protection thereof.

2. State of the Art

Light duty submersible motors such as those disclosed in U.S. Pat. No. 3,631,275 and 3,814,961, employ plastic housings and may include a potting material encasing the motor within the housing. Such motors, while suitable for water pumping and vessel propulsion, do not generate a high enough output for commercial and industrial applications.

High output submersible pumps are used worldwide for many commercial and industrial pumping applications where conventional horizontal or vertical pumps are less than satisfactory. Such applications include disposition in locations which are too deep for a standard over-hung vertical pump, in those where a standard horizontal pump would require a suction lift operation or utilization of a special below-grade pump vault, and in those situations where portability is a primary or major requirement.

Submersible pumps for industrial applications which address the above situations are commercially available and generally utilize a cast iron electric motor housing and sealed stainless steel or alloy steel drive shaft. However, two hostile pumping environments which have created the most difficulty and greatest obstacle or challenge to the utilization of the submersible pumps are those which involve corrosive fluids and abrasive slurries, the latter being defined as a mixture or suspension of solids in a liquid phase. Examples of applications for submersible pumps in such hostile environments include, without limitation, the pumping of $H_2SO_4$-laden coal power plant groundwater runoff; processing of grapefruit, raisins, and other acidic fruits and vegetables; brine pumping; phosphate fertilizer and rock slurry handling; and the pumping and processing of a wide variety of industrial chemicals.

While corrosion-resistant materials, such as special metals, may be used to inhibit corrosion effects on exposed portions of a pumping device, these materials are generally very soft and thereby susceptible to abrasion and erosion by the swirling liquid or slurry being pumped, in which the pump itself is submerged.

It is also known in the prior art to cover certain pump parts, such as impellers and pump casings, with a rubber coating to combat the aforementioned problems. However, not only the actual pump itself but the motor driving a submersible pump is exposed to the turbulent corrosive and/or abrasive and erosive liquid surrounding the pump. Prior art attempts to protect the motor have required motor customization for hostile environment submersible applications. The two known prior art approaches have involved either the fabrication of a special stainless steel motor housing and related hardware to replace the standard cast iron housing assemblies otherwise generally employed in submersible pumps, or the coating of the motor housing with a corrosion- and abrasion/erosion-resistant epoxy coating. The former solution is, of course, expensive from both a material and fabrication standpoint, may involve housing redesign in certain instances, and possesses generally poor abrasion resistance characteristics. The latter solution is somewhat unreliable, as an epoxy coating is of low, variable thickness and bond strength, and is also easily damaged by tool usage and large particle impact actions.

As evidenced by these enumerated shortcomings of the prior art devices, there is an existing and long-felt need for a means and method of protecting a submersible pump against the effects of extremely hostile environments in an economical manner and which may be adapted to a wide variety of existing, commercially available pump designs.

SUMMARY OF THE INVENTION

In contrast to the prior art, the present invention contemplates a method and apparatus for adapting an existing submersible pump motor for use in hostile environments with little or no structural modification and at nominal expense.

Specifically, the apparatus of the present invention comprises a resilient or flexible elastomeric corrosion- and abrasion/erosion-resistant boot or sleeve including a mouth which is disposed over the motor housing of a conventional submersible pump motor and sealed thereto at one end thereof. The boot or sleeve defines a cavity which is filled with a heat-conducting fluid such as water, antifreeze (ethylene glycol) or a mixture of same and water, in order to facilitate the dissipation of the heat generated by an industrial capacity electric motor. The invention may also include a special elastomer-covered lower motor plate and a corrosion-resistant drive shaft sleeve to provide substantially total isolation of the metal motor and drive shaft components from the surrounding fluid.

The invention further contemplates the provision of tubular elastomeric extensions on the top of the boot or sleeve, the extensions accommodating the ends of a loop or sling of cable secured to lifting eyes on the motor and being sealed by clamps or otherwise to the ends of an elastomeric tubular cable housing surrounding the cable loop. Other tubular extensions from the boot or sleeve are provided to accommodate power and control cables extending from the elevated power and control location to the pump. The latter extensions are also sealed, as by clamps, adhesive bonding, or other means known in the art, to the exterior of the cables, which is also of a corrosion- and abrasion/erosion-resistant elastomer or other suitable material.

In addition, for high load or high output motor operation, high environmental fluid temperatures, or operation in environments such as gases (which are poor heat conductors), the present invention may include a dynamic cooling system provided by an inlet and an outlet in the boot or sleeve connected to hose or tubing through which a cooling fluid may be circulated from a remote location in isolation from the liquid, slurry or other fluid medium in which the pump is immersed. The cooling fluid may either be released into the pumping chamber, returned to a suitable waste disposal system, or recirculated to a remote location to be discharged or cooled and circulated again.

DETAILED DESCRIPTION OF THE ILLUSTRATED EMBODIMENT

Figure 1:
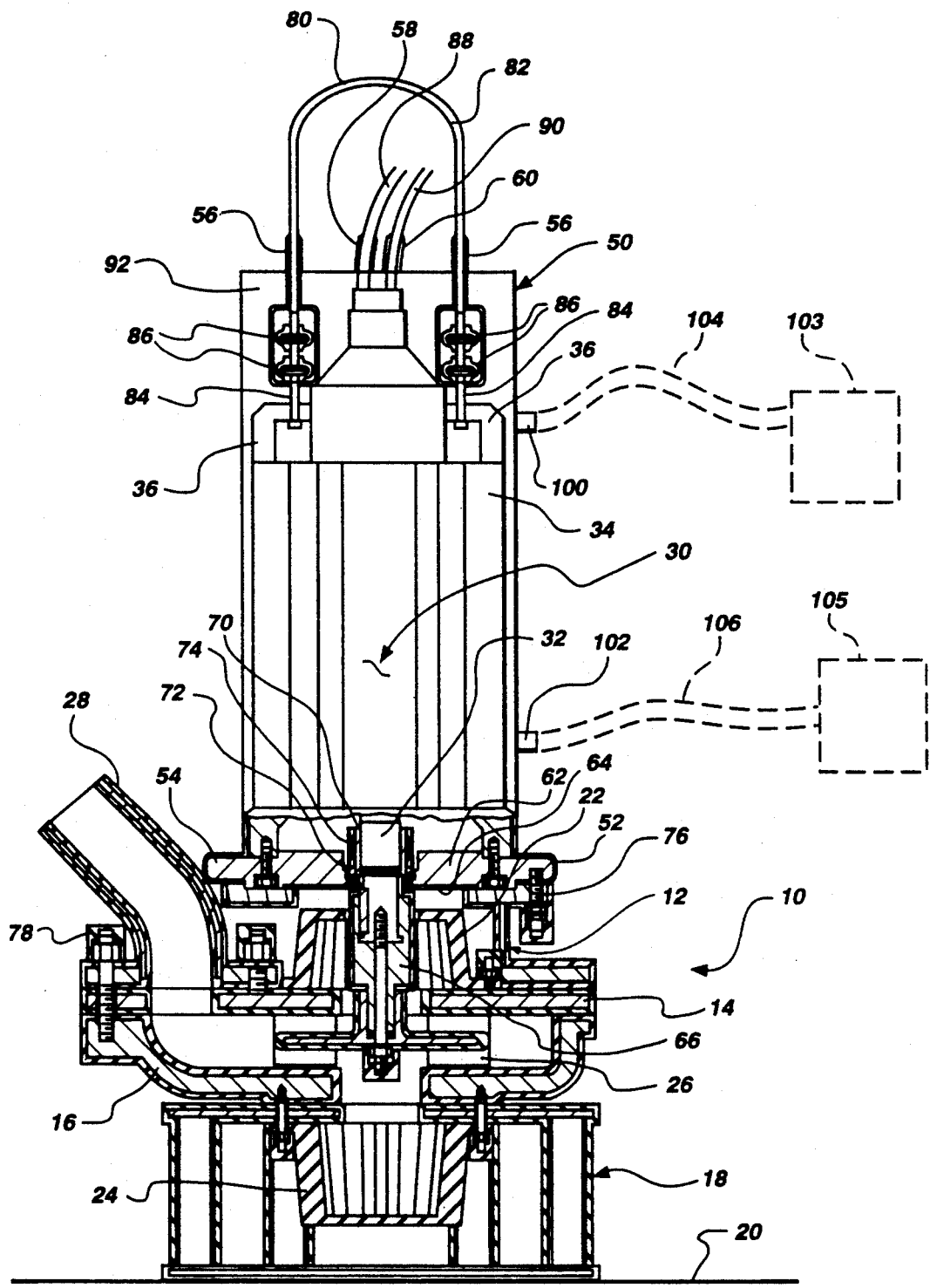
FIG. 1 comprises a schematic sectional side elevation of a submersible pump adapted to hostile environments according to the invention.
Figure 2:
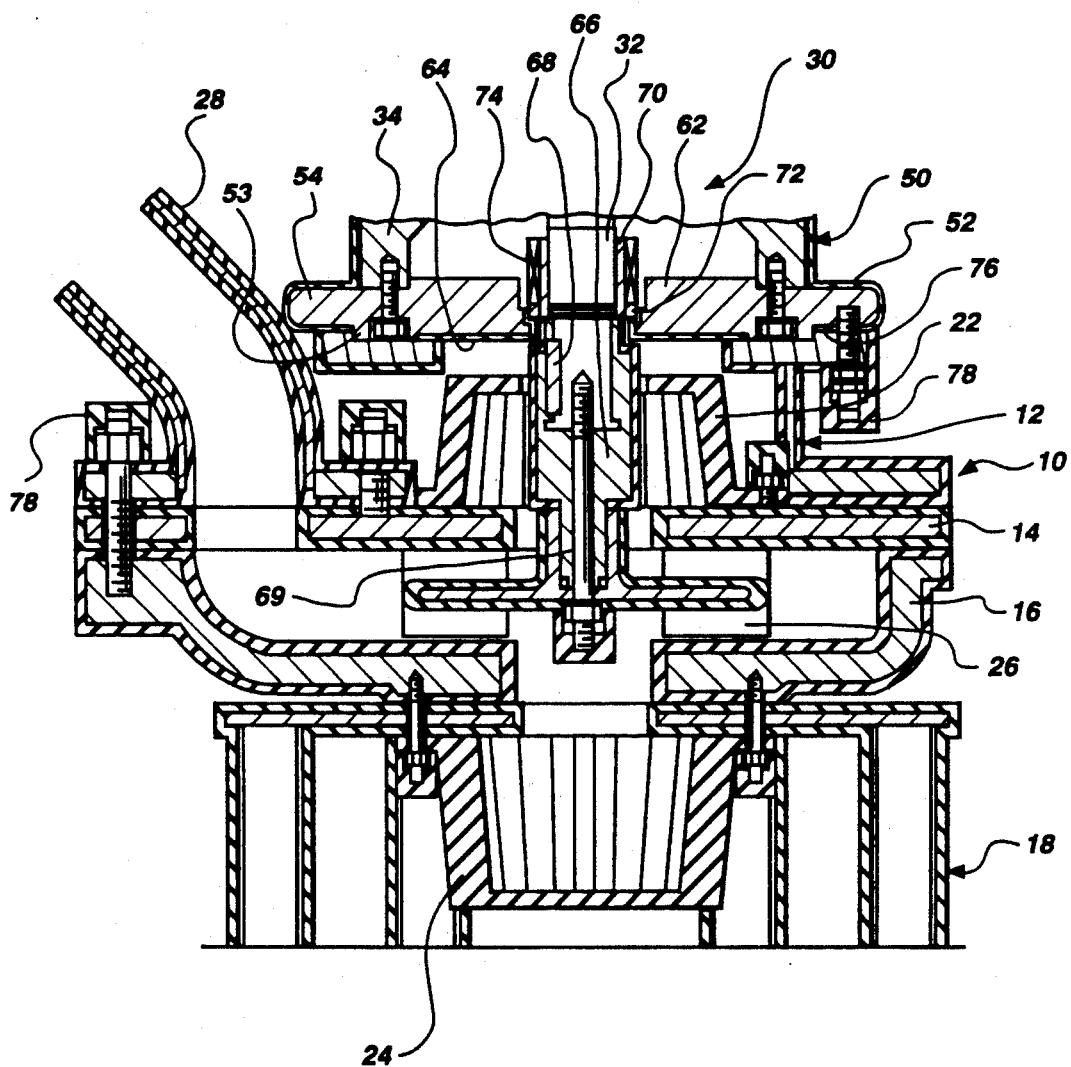
FIG. 2 comprises an enlarged sectional elevation of the lower portion of the motor housing and wet end of the pump as shown in FIG. 1.

Referring now to the drawing figures, electric motor 30 for driving pump assembly 10 is shown above and secured to motor pedestal 12, which in turn rests on and is secured to cover plate 14, casing 16 and stand 18. Such components are entirely conventional, and their arrangement is one commonly employed in the art. Stand 18 rests on a supporting surface 20 in a pumping chamber or vault in which pump 10 is submerged for operation. Pump assembly 10 is of the centrifugal type, with fluid intake shown (by way of example and not limitation) through upper and lower intake screens 22 and 24, moved by impeller 26 into casing 16 and discharged through discharge pipe 28 to a desired remote location via a hose, pipe or other conduit (not shown) leading thereto. It should be understood that use of a single intake screen is also contemplated, as is the use of a variety of pump casing and impeller configurations. Pedestal 12, cover plate 14, casing 16, stand 18, and impeller 26, as well as discharge pipe 28 may all be protected or covered, as shown, with an elastomeric or other corrosion-resistant barrier to the corrosive, abrasive, or erosive fluid surrounding pump 10. Screens 22 and 24 may also be so coated, or may themselves be of a corrosion-, abrasion- and erosion-resistant material.

Impeller 26 is rotationally driven via drive shaft 32 of electric motor 30, which is of conventional flange-mounted design with a cast iron outer housing 34 having lifting eyes 36 thereon. Drive shaft 32 may be of a 416 stainless steel or alloy steel, and may comprise a Nitronic 50 or 316 stainless steel for enhanced acid resistance. Such motors are available from several suppliers, including Reliance Electronic Co. of Cleveland, Ohio and ABS Pump Co. of Meridian, Conn. In the preferred embodiment shown and described herein, the motor is a Reliance Electric Duty Master Submersible, flange mounted, with a 416 stainless steel drive shaft and a standard John Crane Type 21 Mechanical shaft seal. It is adapted for 230, 460 and 575 volt 60 Hz 3-phase power per NEMA Design B. Other specifications, also standard, include a 1.15 Service Factor, Class F insulation, rating for continuous operation in 40° C. liquid under a 200 psi differential at the shaft seal. The motor includes dual sensing probes to indicate moisture intrusion and thermal overload protectors. It should, however, be understood that motor specifications are not determinative or limiting on the application of the present invention thereto, as long as the motor is adapted to run submerged in a liquid environment.

To adapt pump 10 and in particular, motor 30, to the previously-described hostile environments, a flexible, balloon-like boot or sleeve 50 is fabricated of a suitable elastomeric material such as neoprene rubber, butyl rubber, Hypalon elastomer, or natural rubber. The boot wall may include a reinforcing means such as a screen, mesh or cord (such as is employed in tires), which reinforcing means may be of any suitable metallic or nonmetallic material. In the preferred embodiment, the boot 50 comprises hand-laid, molded neoprene rubber. Boot 50 includes lip or flange 52 defining a mouth 53 and an annular cavity 54, as well as tubular lifting extensions 56, tubular power cable extension 58 and tubular control cable extension 60, all of the foregoing being preferably integrally molded or otherwise formed with the body of boot 50. It is also possible, although not preferred, to form extensions 56, 58 and 60 by cutting apertures at appropriate locations in the wall of boot 50 and securing separately fabricated, flanged tubular extensions to the boot wall via adhesive bonding of the flanges thereto.

Annular cavity 54 is adapted to receive the periphery of lower motor plate 62, which is bolted or otherwise secured to the lower edge of motor housing 34 when boot 50 is disposed over motor 30, motor plate 62 itself being covered at least partially by elastomer 64 or, alternatively, being fabricated from a corrosion-resistant material such as stainless steel. Lower motor plate 62 surrounds motor drive shaft 32 which extends downwardly therethrough for driving impeller 26 via coupling 66 and keys 68 and 69. Coupling 66 encompasses the protruding end of drive shaft 32 and is itself coated to resist the hostile environment. The upper end of drive shaft 32 is armored with a hook sleeve 70 of 316 or L820 stainless steel, Hastalloy, nickel alloy or a ceramic material, hook sleeve 70 rotating with shaft 32 inside of seal ring 72, which is surmounted by mechanical shaft seal 74, of the previously noted John Crane type 21.

The lower edge 76 of flange or lip 52 is clamped between pedestal 12 and lower motor plate 62, via a plurality of screws and bolts (unnumbered) as shown. The exposed ends of all fasteners are covered by elastomeric cap nuts such as denoted by numeral 78. Thus, it is apparent that all metal elements of pump assembly 10, with the exception of sleeve 70, are isolated from the environment by elastomeric coverings.

Boot 50, as previously described, may incorporate lifting extensions 56 and cable extensions 58 and 60. Referring specifically to FIG. 1 of the drawings, lifting extensions are used in association with a tubular cable housing 80, which surrounds steel cable 82 looped at its ends 84 through lifting eyes 36 and secured in each loop for lifting pump 10 via eyes 36 by cable clamps 86 or other suitable means. Cable housing 80 is sealed against fluid intrusion proximate its entry points into lifting extensions 56 by clamps, adhesive bonding, heat sealing, or other means known in the art.

Similarly, cable extensions 58 and 60 receive power and control cables 88 and 90, respectively, and to which they are sealed against fluid intrusion. Of course, if a cable includes both power and control conductors, only a single cable extension 58 is needed, or alternatively, more than two cable extensions may be provided as required. Control cable 90 may also incorporate conductors extending to moisture and temperature sensors, motor speed sensors, or to other sensors known in the art. Power and control cables may be encased in cable housings similar to lifting cable housing 80.

It will be appreciated that, to enhance sealing, all mating elastomer surfaces may be coated or provided with an intervening bead of room temperature curing rubber or other suitable sealant.

Boot 50 is filled with a cooling fluid 92 such as water, antifreeze (ethylene glycol), a mixture of antifreeze and water, or other suitable heat-conducting fluid. Motor heat may then be dissipated from housing 34 into the surrounding environment via cooling fluid 92 and through the wall of boot 50, the balloon-like nature of boot 50 providing enhanced surface area for motor cooling and the ability to generally equalize temperatures inside the boot through cooling fluid 92.

If severe heat generation or poor cooling conditions are to be encountered, such as in the operation of a high horsepower motor, a motor under continuous high load, operation in a high temperature fluid or a fluid having poor heat transfer characteristics, the static cooling jacket provided by boot 50 and cooling fluid 92 may be modified to a dynamic cooling system via the addition of tubular cooling extensions 100 and 102 to boot 50, and the circulation of cooling fluid into the boot 50 from a remote location 103 via conduit 104. The cooling fluid may be discharged, if acceptable, into the pumping chamber, or recirculated to the remote location 103, or to a second remote location 105 via conduit 106 for discharge or heat exchange and recirculation to pump 10.

It will be appreciated that the elastomeric boot or sleeve of the present invention has numerous advantages over the prior art use of stainless steel or more exotic alloys including by way of example and not limitation: lower cost; ease of fabrication and adaptability to a variety of existing pump and motor designs, sizes and shapes; excellent resistance to abrasion and erosion; and adaptability in composition to endure specific fluid type, chemical composition and concentration temperature, suspended particulate type and concentration. The present invention, while described in terms of a preferred embodiment of a motor and a pump assembly, is not so limited, as will be apparent to those skilled in the art. It is readily adaptable to horizontal pumps, and, as previously described, can be modified to accommodate a wide variety of lifting, power control and cooling requirements, and the corrosion, erosion and abrasion effects of a multitude of hostile environments. The shape and relative size of the boot or sleeve is not limited to that of the preferred embodiment, but may be varied as desired and include a frustoconical, rounded, or other shaped top. All these and other additions, deletion, and modifications may be made without departing from the spirit and scope of the invention as contemplated by the following claims.

What is claimed:

1. An apparatus for adapting a submersible pump motor to a hostile environment in which a pump including said motor is disposed, comprising:
   a flexible boot of a material resistant to said hostile environment, said flexible boot defining a greater interior volume that said submersible pump motor, said flexible boot substantially enveloping said submersible pump motor and secured in sealing engagement with the exterior thereof so as to define a chamber between said flexible boot and said submersible pump motor exterior in isolation from said hostile environment and the interior of said submersible pump motor; and
   a heat transfer fluid substantially filling said chamber.

2. The apparatus of claim 1, wherein said boot comprises an elastomeric material, and said heat transfer fluid is selected from the group consisting essentially of water, ethylene glycol and a mixture of ethylene glycol and water.

3. The apparatus of claim 1, wherein said boot is of greater lateral extent than that of said substantially enveloped submersible pump motor, of greater longitudinal extent than said submersible pump motor, and includes a first, substantially closed longitudinal end and a second, substantially open longitudinal end adapted for said sealing engagement with said submersible pump motor exterior after envelopment thereof.

4. The apparatus of claim 3, wherein said submersible pump motor includes a motor plate at one end thereof having a drive shaft extending therethrough, and said boot is sealingly engaged proximate its second, open end to said motor plate.

5. The apparatus of claim 4, wherein said boot includes a lip at its said second, open end, defining an annular cavity, and the periphery of said motor plate is received in said annular cavity and clamped to said lip.

6. The apparatus of claim 1, further including first and second tubular lifting extensions penetrating the wall of said boot, said lifting extensions respectively communicating in sealing engagement with first and second ends of a tubular cable housing so as to define a sealed passageway outside of said boot extending from the interior of said boot at said first lifting extension to the said boot interior and said second lifting extension.

7. The apparatus of claim 6, wherein said submersible pump motor includes a motor housing having first and second lifting eyes associated therewith, and said lifting eyes are joined by cable means secured to and extending from a first lifting eye through said passageway to said second lifting eye, to which it is also secured.

8. The apparatus of claim 1 wherein said submersible pump motor comprises an electric motor, and further including at least one cable extension penetrating the wall of said boot and adapted to receive an electrical cable extending from a location outside said submersible boot to said pump motor, and to sealingly engage the exterior of said cable against said hostile environment.

9. The apparatus of claim 8, wherein said electrical cable is encased in a tubular cable housing for protection against said hostile environment.

10. The apparatus of claim 1, wherein said submersible pump motor includes a motor plate at one end thereof having a drive shaft extending therethrough, at least the exterior of said motor plate comprises a material resistant to said hostile environment at locations on said motor plate exterior exposed to said hostile environment, and said boot extends over said submersible pump motor to said one end and sealingly engages said motor plate proximate the periphery thereof.

11. The apparatus of claim 10, wherein said drive shaft is substantially enveloped by a sleeve comprising a material resistant to said hostile environment, and said submersible pump motor includes mechanical seal means surrounding said sleeve and in rotationally sealing engagement therewith.

12. The apparatus of claim 11, wherein said submersible pump motor further includes a seal ring disposed about said sleeve between said mechanical seal means and said motor plate.

13. The apparatus of claim 10, wherein said pump is a vertical pump, said pump motor rests on and is secured to a pedestal surmounting a pumping means driven by said drive shaft, and said boot is clamped between said motor plate and said pedestal in said sealing engagement.

14. The apparatus of claim 1, further including first and second cooling extensions penetrating the wall of said boot, said first cooling extension adapted to communicate in sealing engagement with a first conduit extending from a remote location and to receive said heat transfer fluid from said remote location via said conduit, and said second cooling extension adapted to transmit said heat transfer fluid from said chamber to the exterior thereof.

15. The apparatus of claim 14, wherein said second cooling extension is adapted to communicate with a second conduit extending back to said remote location so that said heat transfer fluid may be circulated in isolation from said hostile environment.

16. A method of protecting a submersible electric motor from a hostile environment, comprising: providing a submersible electric motor; providing an elastomeric boot defining a cavity and having a mouth
   opening into said cavity; disposing said boot over said motor via said mouth so as to
   substantially envelop said motor to one end thereof; sealing the periphery of said mouth to the periphery of said motor
   at said one end thereof; and substantially filling that portion of said cavity between said submersible electric motor and said boot with a heat transfer fluid.

17. The method of claim 16, further comprising providing a power supply to said through said boot from a remote location without exposing said motor to said hostile environment.

18. The method of claim 16, further comprising the step of extending a lifting cable from said motor, outside of said boot and back into said boot to said motor without exposing said motor to said hostile environment.

19. The method of claim 16, comprising circulating said heat transfer fluid into said boot from a first remote location in isolation from said hostile environment, and expelling said heat transfer fluid from said boot.

20. The method of claim 19, wherein said heat transfer fluid is expelled from said boot back to a second remote location in isolation from said hostile environment.

21. The method of claim 19, wherein said heat transfer fluid is expelled from said boot back to said first remote location in isolation from said hostile environment, cooled, and recirculated into said boot.

* * * * *